Nov. 25, 1969   R. G. MINER   3,479,837

MOTOR CONTROL FOR REFRIGERATION SYSTEM

Filed Dec. 4, 1968

INVENTOR.
ROBERT G. MINER

BY Carl M. Lewis

ATTORNEY

United States Patent Office 3,479,837
Patented Nov. 25, 1969

3,479,837
MOTOR CONTROL FOR REFRIGERATION SYSTEM
Robert G. Miner, La Crosse, Wis., assignor to The Trane Company, La Crosse, Wis., a corporation of Wisconsin
Filed Dec. 4, 1968, Ser. No. 780,997
Int. Cl. F25b 1/00, 41/00
U.S. Cl. 62—230
4 Claims

ABSTRACT OF THE DISCLOSURE

A compression cycle refrigeration system driven by a refrigerant cooled motor having power circuit overload interrupting means that will not be damaged by fault currents of the order accompanying motor burnout or shorting.

---

Figure 1:
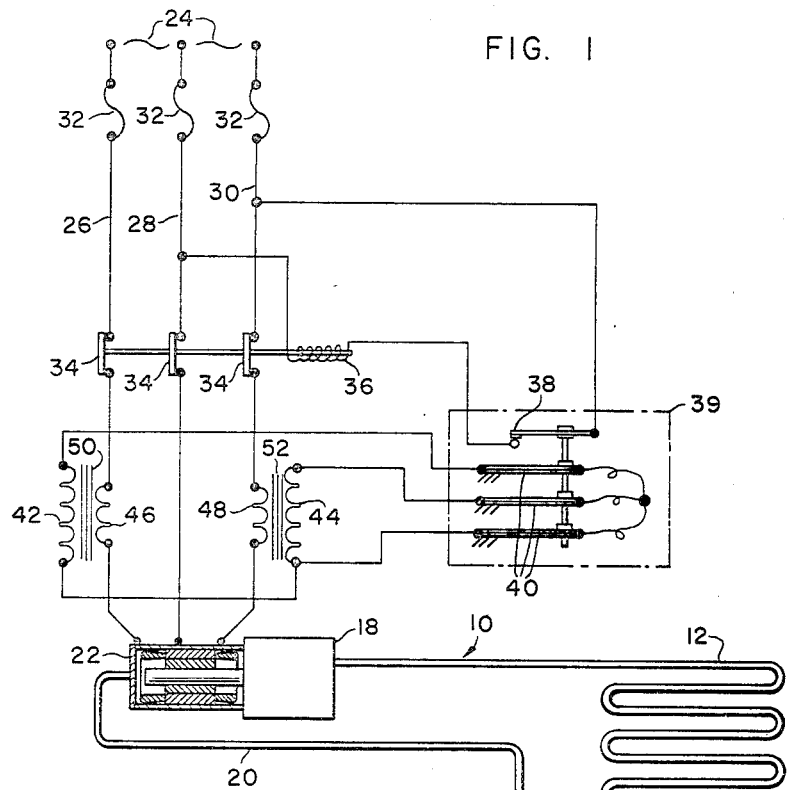

This invention relates to compression cycle refrigeration systems and the control of the motors for driving the compressors thereof. In recent years substantial progress has been made in reducing the cost and bulk of compression cycle refrigeration systems. This is particularly true of the compressor portion of the refrigeration systems inasmuch as the induction drive motor for the compressor has been made lighter, smaller, and lower in cost. These advances in refrigerant compressor motors have been brought about largely by improvements in motor cooling permitting the motor to be constructed with less mass.

Many motors associated with refrigeration systems today utilize the refrigeration system refrigerant as the primary means of cooling. Because of the efficiency in which the refrigerant removes heat from the compressor motor, it is now possible to operate such refrigerant cooled induction motors with a full load current as high as one-third the locked rotor or motor starting current. Without such refrigerant cooling it would be normal to operate the same motor with a full load current of only one-sixth the locked rotor current. Thus it is possible to construct a hermetic refrigerant cooled motor and with about one-half the size and weight of a corresponding motor cooled by other common means.

It will be obvious that motors of this sort are far more critical as to their cooling requirements. Overload circuit breaking means must be designed for faster operation as such motors will be damaged sooner under overload conditions. Overload relay are provided for the purpose of protecting the motor and associated equipment and wiring against overload currents that may result from overloading the compressor. It should be understood, however, that such relays are not for the purpose of providing protection against the effects of fault currents, such as motor winding shorts or shorts to ground. The size of such fault currents is a function of the power supply. Such fault currents are normally very short in duration and generally far in excess of 10 times the full load current of the motor. Overload relays are not designed to protect against these currents as opening of the contactor or circuit breaking interrupting means under these high current conditions will cause the circuit breaking means to explode.

One overload protection system in common use today has an overload relay which upon sufficient energization for a sufficiently long duration will actuate the motor contactor or circuit breaker to the open power circuit position. The overload relay may be powered by one or more current transformers which energize the overload relay with a lower current but one which is substantially proportional to the current drawn by the motor. Because of this substantially proportional relationship between the motor current and the current delivered to the overload relay, motor currents experienced during motor burnout or motor shorting are of such magnitude as to burnout or seriously damage the overload relay. While fuses are normally employed in the motor power circuit, they can not be sized sufficiently small so as to function fast enough to provide protection for these conventional overload relay systems. This of course is very undesirable if the damaged overload relay goes undiscovered as the overload relay is a safety device.

In order to prevent this chain of events, and yet to provide an overload relay system which is sufficiently fast in operation for protecting refrigerant cooled motors, I have provided the current transformers with just enough iron in the cores thereof so as to become magnetically saturated at motor currents corresponding to motor burnout or shorts. When the core becomes saturated, the current in the secondary winding, which is connected to the overload relay, departs from its proportional relationship with the current in the primary winding and is greatly limited so as not to cause burnout of the overload relay.

Thus, it is the principal object of this invention to provide means of preventing the fault currents experienced during motor burnout and motor shorting from destroying the overload relays used in protecting refrigerant cooled motors of refrigeration systems.

It is a further object of this invention to provide a refrigerant cooled motor of a refrigeration system with fast acting motor power circuit interrupting means which is not subject to failure in the event of motor shorting or burnout.

It is a further object of this invention to provide a safer control system for a refrigerant cooled compressor motor.

It is also an object of this invention to provide a refrigerant cooled compressor motor of no greater cost than presently used motors and which has a lower maintenance cost.

Specifically this invention involves a vapor compression refrigeration system comprising: a refrigerant circuit including a refrigerant compressor, a refrigerant condenser, a refrigerant throttling means and a refrigerant evaporator, respectively, serially connected in a closed refrigerant loop, an alternating current electric motor drivingly connected to said compressor; a shell hermetically sealing said motor and compressor; and means for passing at least a portion of the refrigerant in said refrigerant circuit in heat exchange relation with said motor for removing from said motor a major portion of the heat generated therein; an alternating current power source; a first winding; an electric power circuit serially connecting said motor, said first winding and said power source; a second winding; a circuit interrupting means for limiting the current in said electric power circuit in response to a current in said second winding in excess of a first predetermined value but less than a second predetermined value which would damage said circuit interrupting means; and magnetically saturable core means inductively coupling said first and second windings wherein the magnetic field produced in said core means when substantially saturated is insufficient to induce a current in said secondary winding above said second predetermined value.

Figure 2:
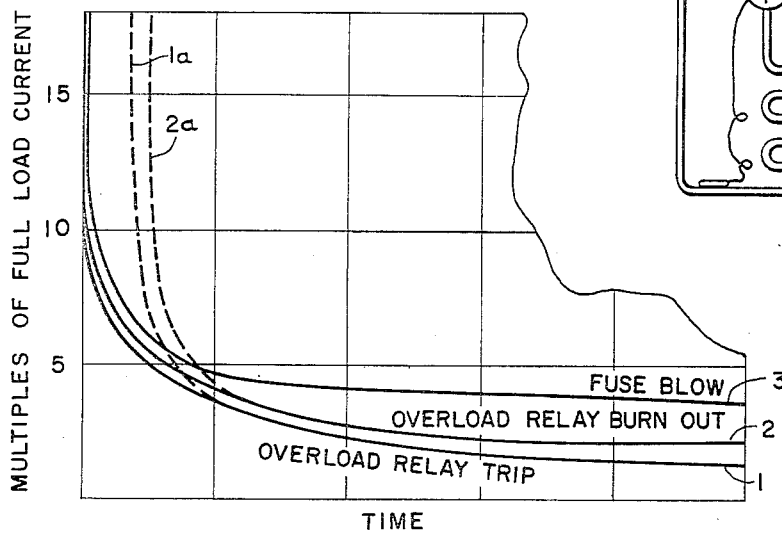

Other objects and advantages will become apparent as this specification proceeds to describe the invention with reference to the drawing in which:

FIGURE 1 is a schematic of a refrigeration system employing the instant invention; and FIGURE 2 is a graph showing the time required to blow the system fuse, the time required to burnout the overload relay, and the time required to trip the overload relay for various current levels.

Now looking to FIGURE 1 it will be seen that refrigeration system 10 includes a refrigerant condenser 12, a refrigerant throttling means such as superheat responsive expansion valve 14, a refrigerant evaporator 16, and a refrigerant compressor 18, respectively, serially connected in a closed refrigerant loop 20. Compressor 18 is driven by refrigerant cooled motor 22. It will be seen that motor 22 is cooled by cool refrigerant suction gas returning from evaporator 16 passing through motor 22 in route to the inlet of compressor 18. Because of the efficient cooling by this refrigerant, motor 22 has been constructed to operate with a full load current in the order of about one-third its locked rotor current. Motor 22 has been shown as a three-phase motor for purposes of illustration. However, it should be understood that this invention is equally applicable to single phase refrigerant cooled compressor motors.

Motor 22 is connected to a source 24 of three-phase electric power by way of power leads 26, 28, and 30. Each of leads 26, 28, and 30 include a fuse 32 and a normally open contactor switch 34. Switches 34 are closed by energization of contactor coil 36. Contactor coil 36 is serially connected with normally closed switch 38 in a circuit extending between leads 28 and 30. The opening of switch 38 thus deenergizes contactor coil 36 causing contactor switches 34 to open and interrupt the power circuit to motor 22. The closing of switch 38 completes a circuit through contactor coil 36 causing contactor switches 34 to close thereby completing a circuit between power source 24 and motor 22.

The switch 38 is arranged to be operated by the upward deflection of any one of the three bimetal current conducting resistance heaters 40. The heaters 40 are in a Y-connection with the open delta connected windings 42 and 44 as shown. Current is generated in windings 42 and 44 as they are respectively inductively coupled to windings 46 and 48 by iron cores 50 and 52, respectively. Winding 46 is serially connected with one phase of motor 22 in line 26 between motor 22 and switch 34. Winding 48 is serially connected with a second phase of motor 22 in line 30 between motor 22 and switch 34. Under normal operating conditions, including normal starting conditions, the power delivered to bimetal heaters 40 remains substantially proportional to the power delivered to motor 22. However, iron cores 50 and 52 have been sized to start to become magnetically saturated for motor currents exceeding approximately three times the full load current, that is, for any motor currents in excess of those normally encountered under locked rotor conditions by a refrigerant cooled motor. The operating results of this arrangement are graphically illustrated in FIGURE 2.

The ordinate of the graph of FIGURE 2 represents the current drawn by motor 22 in multiples of full load current. The abscissa coordinate of the graph of FIGURE 2 represents time.

Curve 1 illustrates the time required for switch 38 to open for various motor currents. Curve 2 illustrates the time required for relay 39 to be destroyed for various motor currents. Curve 3 illustrates the time required for fuse 32 to blow for various motor currents. It will be noted that curve 1 very closely follows curve 2 and that curve 2 is positioned lower than and to the left of curve 3. Curves 1 and 2 are drawn for the conventional system not employing current transformers having cores 50 and 52 which will saturate at approximately three times full load motor current. It should be noted that for any current condition the time required to destroy relay 39 is less than the time required to blow motor fuse 32. As a consequence, overload relay burnout normally accompanies motor fault currents.

By constructing cores 50 and 52 as above described and in accordance with this invention, curves 1 and 2 are shifted to a position as illustrated by curves 1a and 2a, respectively. It should be noted that for motor currents in excess of approximately 5 times full load current curve 2a is positioned on the righthand side of fuse curve 3. Thus it will be seen that for motor currents in excess of approximately 5 times full load current, which includes all fault currents, the time required to blow the motor fuse 32 is less than the time required to destroy the overload relay 39. On the other hand, the position of curves 1 and 2 remains substantially unchanged for currents in the order of three times full load current. Because the position of curve 1 is substantially unaltered for currents below three times full load current by constructing cores 50 and 52 in the above described manner, the time required for switch 38 to open, that is the time required for relay 39 to trip and open switches 34, is not increased. Thus it will be seen that the fast acting overload relay system is made to withstand fault currents without destruction.

Having now described the preferred embodiment of my invention, I contemplate that many changes may be made without departing from the scope or spirit of my invention and I accordingly desire to be limited only by the claims.

I claim:

1. A vapor compression refrigeration system comprising: a refrigerant circuit including a refrigerant compressor, a refrigerant condenser, a refrigerant throttling means and a refrigerant evaporator, respectively, serially connected in a closed refrigerant loop; an alternating current electric motor drivingly connected to said compressor; a shell hermetically sealing said motor and compressor; and means for passing at least a portion of the refrigerant in said refrigerant circuit in heat exchange relation with said motor for removing from said motor a major portion of the heat generated therein; an alternating current power source; a first winding; an electric power circuit serially connecting said motor, said first winding and said power source; a second winding; a circuit interrupting means for limiting the current in said electric power circuit in response to a current in said second windings in excess of a first predetermined value but less than a second predetermined value which would damage said circuit interrupting means; and magnetically saturable core means inductively coupling said first and second windings wherein the magnetic field produced in said core means when substantially saturated is insufficient to induce a current in said secondary winding above said second predetermined value.

2. The apparatus as defined in claim 1 wherein said motor is an induction motor and said core is substantially saturated by a current in said first winding of a value between about two and one-half to three and one-half times the current in said first winding when said induction motor is operating at full load.

3. The apparatus as defined by claim 1 wherein said circuit interrupting means includes a thermal relay having a bimetallic resistance heater element connected in series with said second winding.

4. The apparatus as defined by claim 1 wherein said circuit interrupting means includes a thermal relay having a resistant heater connected in series with said second winding.

References Cited

UNITED STATES PATENTS 2,782,350   2/1957   Clark _____ 62—230
2,955,436   11/1960  Miner _____ 62—230

MEYER PERLIN, Primary Examiner

U.S. Cl. X.R.
62—505